United States Patent
Uno et al.

(10) Patent No.: US 8,587,970 B2
(45) Date of Patent: Nov. 19, 2013

(54) ISOLATED SWITCHING POWER SUPPLY APPARATUS INCLUDING PRIMARY-SIDE AND SECONDARY-SIDE DIGITAL CONTROL CIRCUITS

(75) Inventors: Yoshiyuki Uno, Nagaokakyo (JP); Akio Nishida, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 226 days.

(21) Appl. No.: 13/039,484

(22) Filed: Mar. 3, 2011

(65) Prior Publication Data

US 2011/0222318 A1   Sep. 15, 2011

(30) Foreign Application Priority Data

Mar. 9, 2010   (JP) ................... 2010-051513

(51) Int. Cl.
   *H02M 3/335*   (2006.01)
(52) U.S. Cl.
   USPC ................ 363/21.15; 363/21.07; 363/21.13
(58) Field of Classification Search
   USPC .......... 363/21.07, 21.13–21.15, 21.17, 21.18, 363/34, 36, 65; 323/283–285
   See application file for complete search history.

(56) References Cited

U.S. PATENT DOCUMENTS

| | | | |
|---|---|---|---|
| 5,349,523 A | 9/1994 | Inou et al. | |
| 5,675,480 A | 10/1997 | Stanford | |
| 5,905,369 A * | 5/1999 | Ishii et al. | 323/272 |
| 5,982,642 A * | 11/1999 | Herfurth | 363/21.08 |
| 6,034,514 A | 3/2000 | Sakai | |
| 6,344,986 B1 * | 2/2002 | Jain et al. | 363/89 |
| 6,650,552 B2 * | 11/2003 | Takagi et al. | 363/17 |
| 6,781,852 B2 * | 8/2004 | Hatta et al. | 363/17 |
| 6,839,247 B1 * | 1/2005 | Yang et al. | 363/21.11 |
| 6,980,441 B2 * | 12/2005 | Man-ho | 363/21.06 |
| 7,012,818 B2 * | 3/2006 | Kotsuji et al. | 363/21.01 |
| 7,075,193 B2 * | 7/2006 | Yang et al. | 307/66 |
| 2003/0063480 A1 * | 4/2003 | Morita et al. | 363/37 |
| 2005/0105311 A1 | 5/2005 | Soldano | |
| 2008/0112194 A1 * | 5/2008 | Sarkela | 363/21.16 |
| 2008/0192509 A1 * | 8/2008 | Dhuyvetter et al. | 363/17 |
| 2010/0103703 A1 * | 4/2010 | Nishiyama et al. | 363/17 |

FOREIGN PATENT DOCUMENTS

| | | |
|---|---|---|
| CN | 1864319 A | 11/2006 |
| EP | 1 152 519 A2 | 4/2001 |
| JP | 61-280773 A | 12/1986 |
| JP | 63-167632 A | 7/1988 |
| JP | 06-245505 A | 9/1994 |

(Continued)

OTHER PUBLICATIONS

Official Communication issued in corresponding Japanese Patent Application No. 2010-051513, mailed on Jul. 17, 2012.

*Primary Examiner* — Adolf Berhane
*Assistant Examiner* — Gary Nash
(74) *Attorney, Agent, or Firm* — Keating & Bennett, LLP (57) ABSTRACT

A switching power supply apparatus includes a PFC converter, a DC-DC converter, and primary-side and secondary-side digital control circuits that control the PFC converter and the DC-DC converter. On the basis of a voltage detected by an output voltage detection circuit, the primary-side digital control circuit transmits data about the on-time of a switching element of the DC-DC converter to the primary-side digital control circuit. On the basis of this data, the primary-side digital control circuit controls the on-time of the switching element.

9 Claims, 9 Drawing Sheets

(56) References Cited

FOREIGN PATENT DOCUMENTS

| | | |
|---|---|---|
| JP | 10-094252 A | 4/1998 |
| JP | 10-309078 A | 11/1998 |
| JP | 11-206112 A | 7/1999 |
| JP | 2001-238452 A | 8/2001 |
| JP | 2001-275344 A | 10/2001 |
| JP | 2001-320879 A | 11/2001 |
| JP | 2003-348775 A | 12/2003 |
| JP | 2006-304430 A | 11/2006 |
| JP | 2008-067443 A | 3/2008 |
| JP | 2009-131036 A | 6/2009 |
| WO | 2009/011374 A1 | 1/2009 |
| WO | 2010/000010 A1 | 1/2010 |

* cited by examiner

ISOLATED SWITCHING POWER SUPPLY APPARATUS INCLUDING PRIMARY-SIDE AND SECONDARY-SIDE DIGITAL CONTROL CIRCUITS

BACKGROUND OF THE INVENTION

1. Field of the Invention

The present invention relates to an isolated switching power supply apparatus where required isolation between the primary side and the secondary side is achieved by using digital control circuits, such as digital signal processors (DSPs), as control circuits.

2. Description of the Related Art

In switching power supplies using a commercial power supply apparatus as an input, it is mandatory to ensure isolation between the primary side and the secondary side of a transformer for safety reasons. To control an output voltage or output current on the secondary side, a feedback circuit detects the output voltage or output current and feeds it back to the primary side so as to control a switching circuit on the primary side. The feedback circuit itself is also required to ensure isolation between its primary and secondary sides. See, for example, International Patent Application Publication 2009/011374.

In recent years, attention has been paid to "digital control power supplies" using a digital control circuit, such as a microprocessor or DSP, as a control circuit for controlling a primary-side switch. The digital control circuit for controlling a primary-side switching circuit is generally disposed on the primary side. In the case where the input voltage is high, it is necessary to use a digital control circuit composed of a high-voltage semiconductor device, or to provide the transformer with another winding to generate a voltage for driving the digital control circuit. On the other hand, there is a desire to dispose a digital control circuit on the secondary side (load side) to utilize a merit thereof, the communication function. Specifically, in order to transmit or receive various types of information to or from a load circuit or external device, it is preferable that a digital control circuit be disposed on the secondary side.

Figure 1:
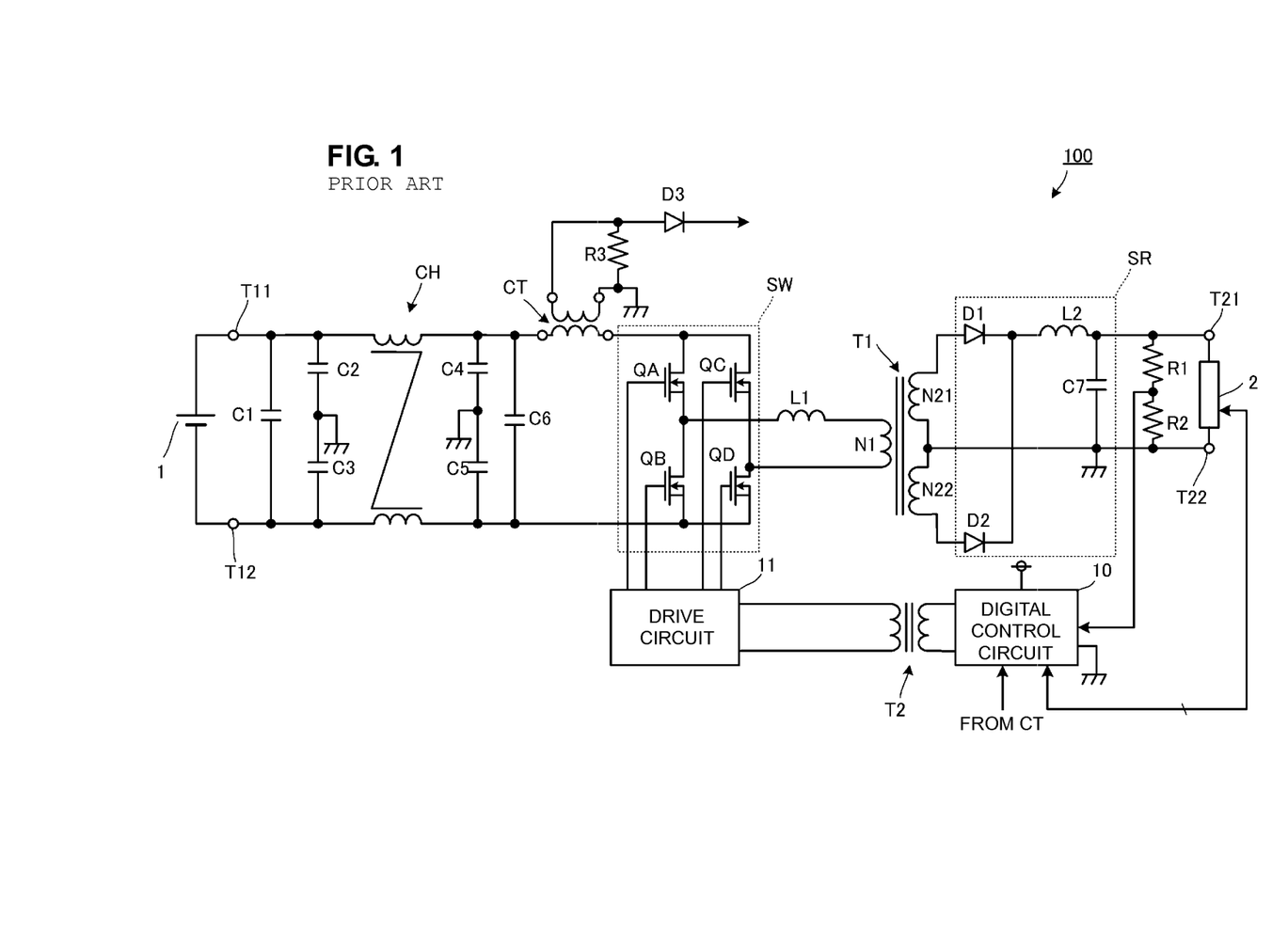
FIG. 1 is a diagram showing the basic configuration of an isolated DC-DC converter disclosed in International Patent Application Publication 2009/011374.

FIG. 1 shows the basic configuration of an isolated DC-DC converter disclosed in International Patent Application Publication 2009/011374.

In FIG. 1, a transformer T1 includes a primary winding N1 and secondary windings N21 and N22. A switching circuit SW composed of four bridge-connected switching elements QA, QB, QC, and QD and an inductor L1 are connected to the primary winding N1. A filter circuit composed of a common-mode choking coil CH and bypass capacitors C1 to C6 and a current transformer CT are provided between an input power supply 1 and the switching circuit. A resistor R3 and a rectifier diode D3 are connected to the secondary side of the current transformer CT so that current flowing into the primary side thereof is outputted to the resistor and the rectifier diode as a voltage signal.

A drive circuit 11 is connected to the four switching elements QA to QD of the switching circuit SW.

A rectifying smoothing circuit composed of rectifier diodes D1 and D2, an inductor L2, and a capacitor C7 is connected to the secondary windings N21 and N22 of transformer T1. The rectifying smoothing circuit outputs an output voltage to output terminals T21 and T22. A load circuit 2 is connected between the output terminals T21 to T22. An output voltage detection circuit composed of resistors R1 and R2 are provided between the output terminals T21 to T22.

A digital control circuit 10 is composed of a DSP and is provided on the secondary side. The digital control circuit 10 outputs a control pulse signal for the switching circuit SW to a pulse transformer T2. The drive circuit 11 receives the above-mentioned control pulse signal via the pulse transformer T2 so as to drive the switching elements QA to QD of the switching circuit SW.

On the basis of the rising timing and the falling timing of the control pulse signal in the pulse transformer T2, the drive circuit 11 phase-controls the drive pulse signals of the switching elements QA to QD so as to turn on or off a set of the switching elements QA and QD and a set of the switching elements QB and QC alternately.

As shown in FIG. 1, in an attempt to control the primary-side switching circuit by disposing the digital control circuit on the secondary side, use of the pulse transformer T2 can reduce the size of the transformer. However, since a pulse transformer generally has a small inductance value, it can transmit only a signal corresponding to the edge of the pulse waveform. That is, the pulse transformer transmits only a timing signal. This creates a need to provide, on the primary side, a drive circuit that receives the timing signal to actually generate a signal for driving the switching circuit. Omission of this drive circuit creates a need to transmit a pulse-shaped drive signal itself from the secondary side to the primary side. This requires a transformer having a large inductance value (drive transformer), preventing downsizing of the transformer. Moreover, use of an isolating element, such as a photocoupler, disadvantageously causes the deterioration of responsiveness or degradation with time.

In the case where a switching power supply apparatus controlled by a digital control circuit, such as a DSP, is a large-capacity power supply apparatus using a commercial power supply apparatus as an input, it is virtually essential to incorporate a PFC (power factor correction) converter into the switching power supply apparatus so as to satisfy the harmonic current regulation. Further, in a DC-DC converter including a PFC converter, control of both the PFC converter and the DC-DC converter by a single digital control circuit disadvantageously requires the digital control circuit to have a high high-speed processing capability.

SUMMARY OF THE INVENTION

Accordingly, preferred embodiments of the present invention provide an isolated switching power supply apparatus that includes less components and is low-cost and highly functional while maintaining the advantages of use of a digital control circuit.

An isolated switching power supply apparatus according to a first preferred embodiment of the present invention includes a PFC converter including a voltage input unit that receives a voltage of a commercial power supply apparatus; a rectifier circuit that rectifies the commercial power supply voltage received by the voltage input unit; at least one boost converter circuit that is connected to a latter stage of the rectifier circuit and includes an inductor, a switching element, and a rectifying element; a smoothing circuit connected to a latter stage of the boost converter circuit; and a switching controller that on/off controls the switching element so that input current received from the commercial power supply has a shape similar to the shape of the commercial power supply voltage. The isolated switching power supply apparatus also preferably includes: a transformer that includes at least isolated primary and secondary windings; a switching circuit that switches a voltage to be applied to the primary winding by the smoothing circuit; a secondary-side rectifying smoothing circuit that rectifies and smoothes an alternating-current voltage generated in the secondary winding; a voltage output unit that outputs a voltage obtained by the secondary-side rectifying smoothing circuit; secondary-side output voltage detector that detects the voltage obtained by the secondary-side rectifying smoothing circuit; a primary-side digital control circuit that is disposed on the primary side of the transformer and includes a switching controller which controls on/off operation of at least one of the boost converter circuit and the switching circuit; a secondary-side digital control circuit that is disposed on the secondary side of the transformer, receives the voltage detected by the secondary-side output voltage detector, and includes a feedback controller which generates a feedback signal to control the switching circuit; and an isolated signal transmitter that performs serial communications between the primary-side and secondary-side digital control circuits while maintaining isolation therebetween.

An isolated switching power supply apparatus according to a second preferred embodiment of the present invention includes a bridgeless PFC converter including a voltage input unit that receives a voltage of a commercial power supply; a first rectifier circuit including a series circuit of a first switching element and a rectifying element and is connected to a first terminal of the voltage input unit via an inductor; a second rectifier circuit including a series circuit of a second switching element and a rectifying element and is connected to a second terminal of the voltage input unit; a smoothing circuit connected to a latter stage of the second rectifier circuit; and a switching controller that on/off controls the first and second switching elements so that input current received from the commercial power supply has a shape similar to the shape of the commercial power supply voltage. The isolated switching power supply apparatus also preferably includes a transformer that includes at least isolated primary and secondary windings; a switching circuit that switches a voltage to be applied to the primary winding by the smoothing circuit; a secondary-side rectifying smoothing circuit that rectifies and smoothes an alternating-current voltage generated in the secondary winding; a voltage output unit that outputs a voltage obtained by the secondary-side rectifying smoothing circuit; a secondary-side output voltage detector that detects the voltage obtained by the secondary-side rectifying smoothing circuit; a primary-side digital control circuit that is disposed on the primary side of the transformer and includes a switching controller which controls on/off operation of at least one of the first and second rectifier circuits and the switching circuit; a secondary-side digital control circuit that is disposed on the secondary side of the transformer, receives the voltage detected by the secondary-side output voltage detector, and includes a feedback controller that generates a feedback signal to control the switching circuit; and an isolated signal transmitter that performs serial communications between the primary-side and secondary-side digital control circuits while maintaining isolation therebetween. Terminals adjacent to the first and second switching elements, of the first and second rectifier circuits are connected to each other, and terminals adjacent to the rectifier elements, of the first and second rectifier circuits are connected to each other.

According to various preferred embodiments of the present invention, a digital control circuit is disposed on each of the primary side and the secondary side, and signals are only serially communicated between the two digital control circuits via an isolator. Thus, only digital signals are communicated via the isolator between the primary and secondary sides, allowing even complicated control to be performed using the simple circuit configuration.

Moreover, feedback paths requiring primary-secondary isolation can be combined into one. That is, signals can be communicated between the two digital control circuits via the serial bus. Thus, even in the case where there are multiple control targets, signals can basically be communicated via the single signal path.

For example, the primary-side digital control circuit receives an error signal between an output from the secondary-side digital control circuit and a reference signal and performs operation and signal generation to control the primary-side switching circuit, while the secondary-side digital control circuit performs detection of an output, output of an error signal, communications with a load, and the like. That is, the processes can be shared by the primary-side and secondary-side digital control circuits, allowing use of DSPs, which are less functional and low-cost.

A digital signal that is transmitted via the isolator between the primary and secondary sides is not required to have the linearity of a transmission signal. Thus, a pulse transformer, digital isolator, or the like can be used.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 2:
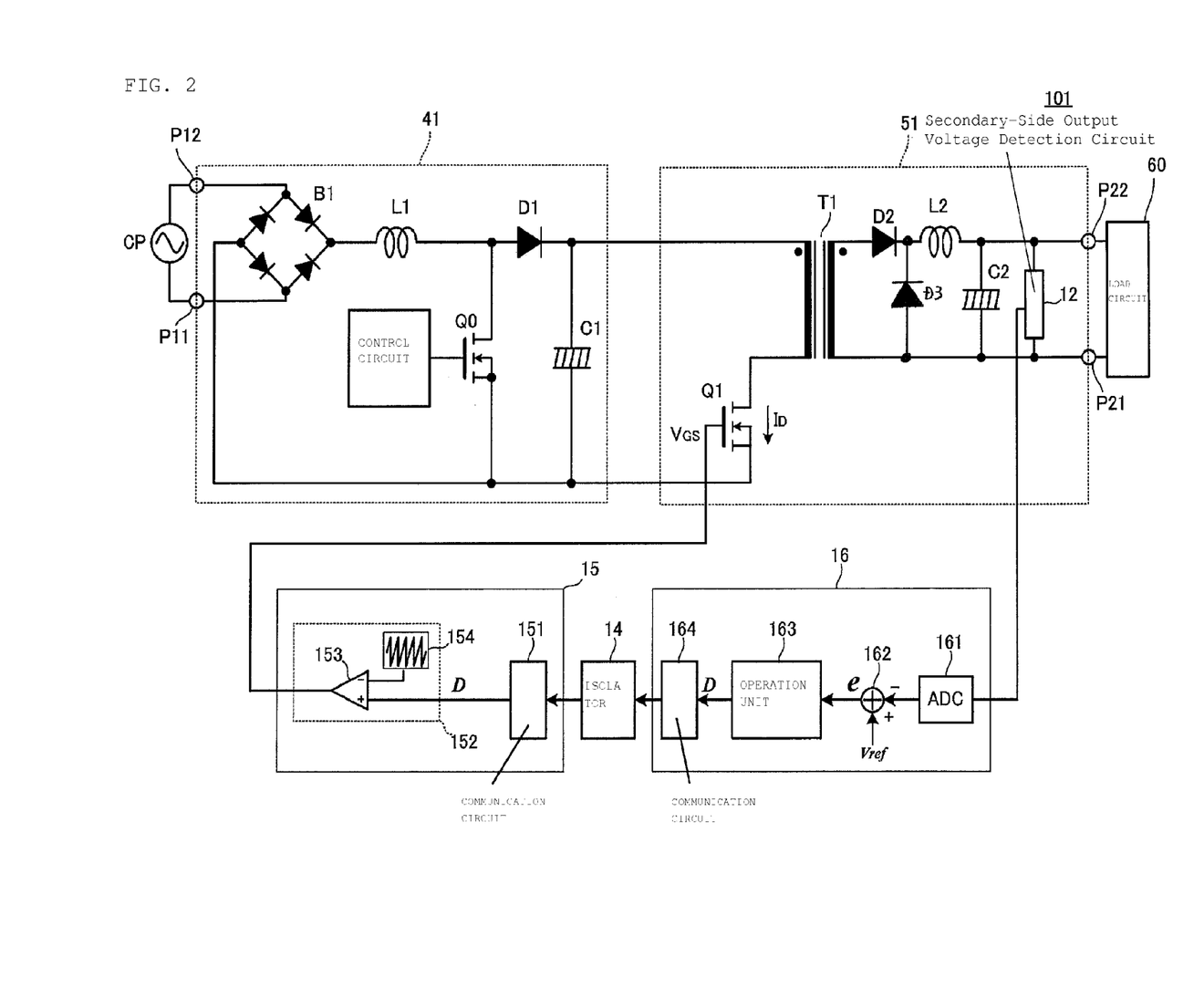
FIG. 2 is a circuit diagram of a switching power supply apparatus according to a first preferred embodiment of the present invention.

FIG. 2 is a circuit diagram of an isolated switching power supply apparatus (hereafter simply referred to as a "switching power supply apparatus") 101 according to a first preferred embodiment of the present invention. The switching power supply apparatus 101 preferably includes a PFC converter 41, a DC-DC converter 51, a primary-side digital control circuit 15, and a secondary-side digital control circuit 16. The primary-side and secondary-side digital control circuits control the PFC converter 41 and the DC-DC converter 51.

A commercial power supply CP is connected to voltage input units P11 and P12 of the switching power supply apparatus 101. A load 60 is connected to voltage output units P21 and P22 of the switching power supply apparatus 101.

A diode bridge B1, which full-wave rectifies an input voltage, an inductor L1, a switching element Q0, and a diode D1 define a boost converter circuit. A capacitor C1 defines a smoothing circuit that smoothes an output of the boost converter circuit. The boost converter circuit and the smoothing circuit define the PFC converter 41. The switching element Q0 is controlled so that the peak value or average value of current flowing into the inductor L1 is sinusoidal. This advantageously suppresses harmonic current so that the power factor is improved.

A switching element Q1 included in a switching circuit is connected in series with the primary winding of a transformer T1. The switching element Q1 switches a voltage to be applied to the primary winding of the transformer T1. A secondary-side rectifying smoothing circuit including diodes D2 and D3, an inductor L2, and a capacitor C2 is provided between the secondary winding of the transformer T1 and the voltage output units P21 and P22. The secondary-side rectifying smoothing circuit rectifies and smoothes an alternating-current voltage generated in the secondary winding of the transformer T1. A secondary-side output voltage detection circuit 12, which is connected to the voltage output units P21 and P22, detects a voltage outputted to the voltage output units P21 and P22.

The switching element Q1, the transformer T1, the diodes D2 and D3, the inductor L2, and the capacitor C2 define the forward DC-DC converter 51.

The primary-side digital control circuit 15 is disposed on the primary side of the transformer T1 and includes a switching controller that controls the on/off operation of the switching circuit.

The secondary-side digital control circuit 16 is disposed on the secondary side of the transformer T1 and receives the voltage detected by the secondary-side output voltage detection circuit 12 and transmits information about an on-time D of the switching element Q1 (feedback signal) to the primary-side digital control circuit 15 so that the received voltage is maintained at a default value. The feedback signal is generated by a feedback controller according to a preferred embodiment of the present invention. On the basis of this information, the primary-side digital control circuit 15 determines the on-time D of the switching element Q1.

The primary-side digital control circuit 15 and the secondary-side digital control circuit 16 communicate with each other serially via isolated signal transmitter 14.

Figure 3:
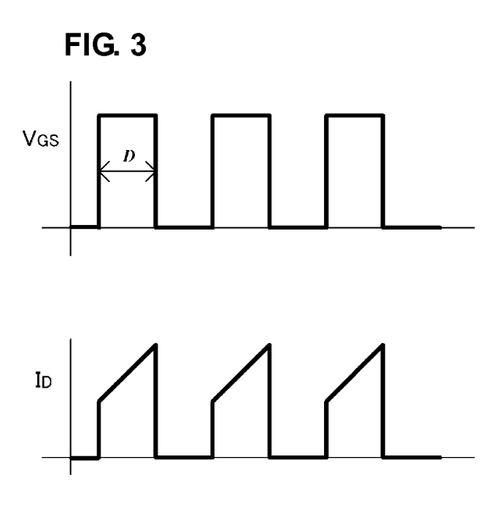
FIG. 3 includes a waveform diagram of current flowing into a switching element of the switching power supply apparatus and a waveform diagram of a gate control signal of the switching element.

FIG. 3 includes a waveform diagram of current $I_D$ flowing into the switching element Q1 of the switching power supply apparatus 101 shown in FIG. 2 and a waveform diagram of a gate control signal $V_{GS}$ of the switching element Q1. While the level of the gate control signal $V_{GS}$ is high, the switching element Q1 is on. The secondary-side digital control circuit 16 of the switching power supply apparatus 101 transmits information about the on-time D to the digital control circuit 15, that is, the digital control circuit 16 transmits a digital value that the digital control circuit 15 uses in order to set the D as the on-time of the switching element Q1.

The secondary-side digital control circuit 16 includes an AD converter 161, an adder 162, an operation unit 163, and a communication circuit 164. Note that the secondary-side digital control circuit 16 preferably includes a DSP rather than an analog circuit or wired logic circuit, for example.

The AD converter 161 converts the voltage detected by the secondary-side output voltage detection circuit 12 into a digital value. The adder 162 calculates an error e between the digital value and a reference voltage value Vref. On the basis of the error e, the operation unit 163 obtains on-time data D required to reduce the error e, and performs predetermined phase compensation on the data D. The amount of phase compensation is determined such that feedback operation is kept stable and highly responsive. The communication circuit 164 transmits the data D to the primary-side digital control circuit 15 via the isolated signal transmitter 14 in an isolated state.

The primary-side digital control circuit 15 includes a PWM generation module 152 including a counter 154 and a comparator 153, and a communication circuit 151. Note that the digital control circuit 15 preferably includes a DSP rather than an analog circuit or wired logic circuit, for example.

The communication circuit 151 receives the data D. The comparator 153 compares the value of the data D with that of the counter 154. While the value of the data D is smaller than that of the counter 154, the comparator 153 outputs high-level signals. The value of the counter 154 varies preferably in the form of a sawtooth wave.

Accordingly, the PWM generation module 152 performs pulse width modulation on the value of the data D and outputs the resulting data as the gate control signal $V_{GS}$.

Figure 4:
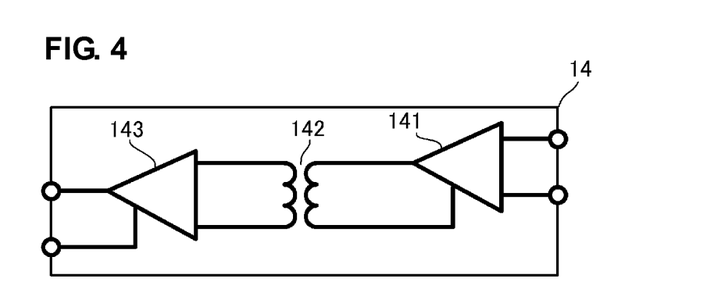
FIG. 4 is a circuit diagram of an isolated signal transmitter.

FIG. 4 shows the configuration of the isolated signal transmitter 14. In this example, the isolated signal transmitter 14 preferably is a digital isolator including a transformer 142, where microcoils are opposed with an isolator layer therebetween, a driver circuit 141, and a receiver circuit 143. These circuits are preferably formed on a chip in a semiconductor process. The driver circuit 141 may be configured so that an inputted binary signal is converted into a pulse signal where the rising edge and the falling edge of the binary signal are represented by different numbers of pulses. The receiver circuit 143 reconstructs the rising edge and falling edge in accordance with the pulse numbers and outputs the resulting binary signal.

Such a digital isolator has an extremely small footprint on the mount substrate and consumes an extremely small amount of power compared with a photocoupler or pulse transformer, as well as can transmit data at high speed. This allows formation of an isolated switching power supply apparatus that is small, low-cost, and highly responsive.

Second Preferred Embodiment

Figure 5:
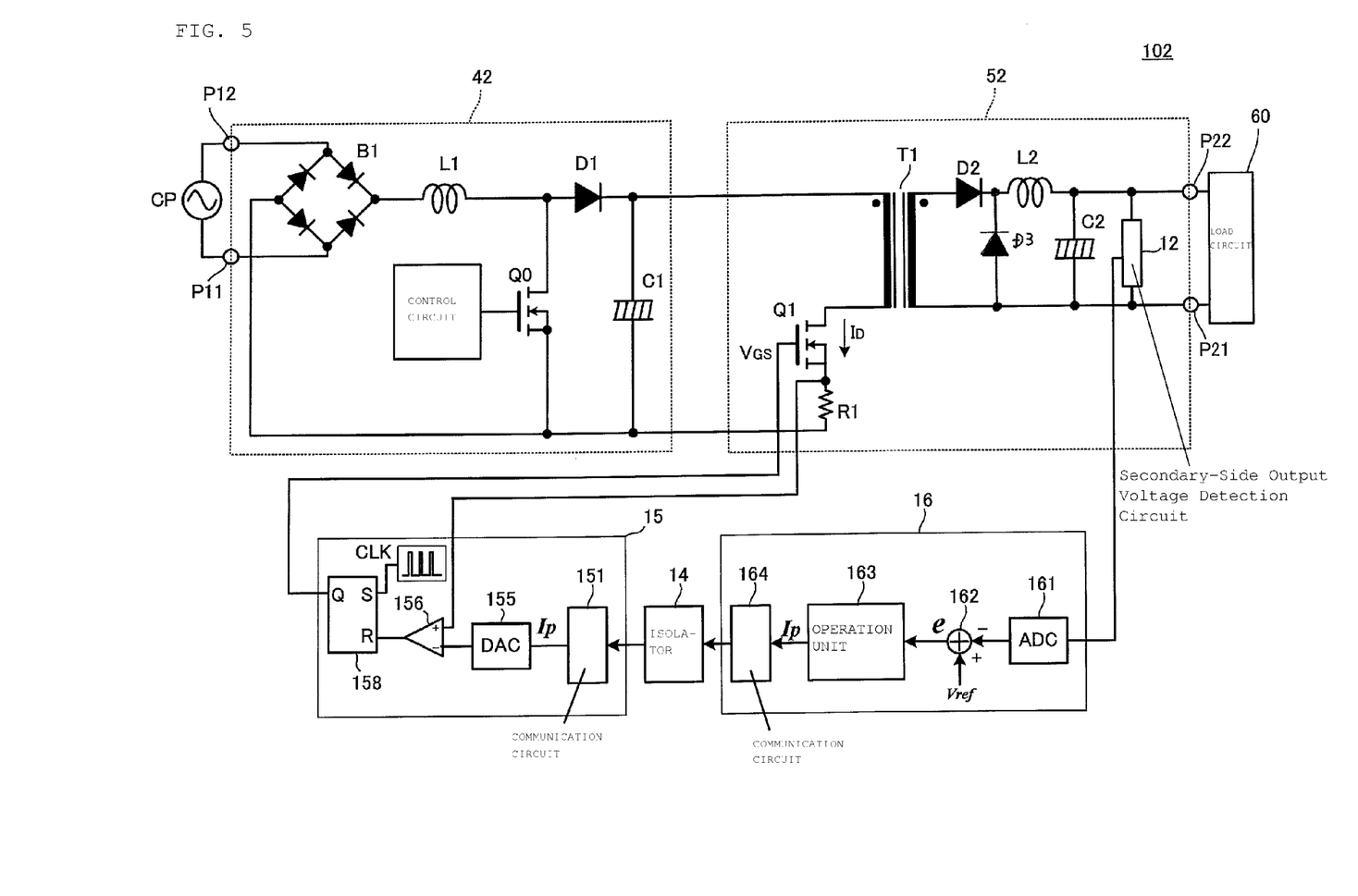
FIG. 5 is a circuit diagram of a switching power supply apparatus according to a second preferred embodiment of the present invention.

FIG. 5 is a circuit diagram of a switching power supply apparatus 102 according to a second preferred embodiment of the present invention. The switching power supply apparatus 102 includes a PFC converter 42, a DC-DC converter 52, and a primary-side digital control circuit 15, and a secondary-side digital control circuit 16. The primary-side and secondary-side digital control circuits control the PFC converter 42 and the DC-DC converter 52.

A commercial power supply CP is connected to voltage input units P11 and P12 of the switching power supply apparatus 102. A load 60 is connected to voltage output units P21 and P22 of the switching power supply apparatus 102.

A diode bridge B1, an inductor L1, a switching element Q0, and a diode D1 define a rectifying switching circuit. A capacitor C1 defines a smoothing circuit that smoothes an output of the rectifying switching circuit. The rectifying switching circuit and the smoothing circuit define the PFC converter 42.

A switching element Q1 defining a switching circuit and a resistor R1 to perform switching circuit current detection are connected in series with the primary winding of a transformer T1. A secondary-side rectifying smoothing circuit including diodes D2 and D3, an inductor L2, and a capacitor C2 is provided between the secondary winding of the transformer T1 and the voltage output units P21 and P22.

The switching element Q1, the transformer T1, the diodes D2 and D3, the inductor L2, and the capacitor C2 define the forward DC-DC converter 52.

The primary-side digital control circuit 15 is disposed on the primary side of the transformer T1 and includes a switching controller that controls the on/off operation of the switching circuit.

The secondary-side digital control circuit 16 is disposed on the secondary side of the transformer T1. It receives a voltage detected by a secondary-side output voltage detection circuit 12 and transmits information about a peak current $I_P$ of the switching element Q1 to the primary-side digital control circuit 15 so that the received voltage is maintained at a default value. On the basis of this information, the primary-side digital control circuit 15 sets D as the on-time of the switching element Q1.

The primary-side digital control circuit 15 and the secondary-side digital control circuit 16 communicate with each other via isolated signal transmitter 14.

Figure 6:
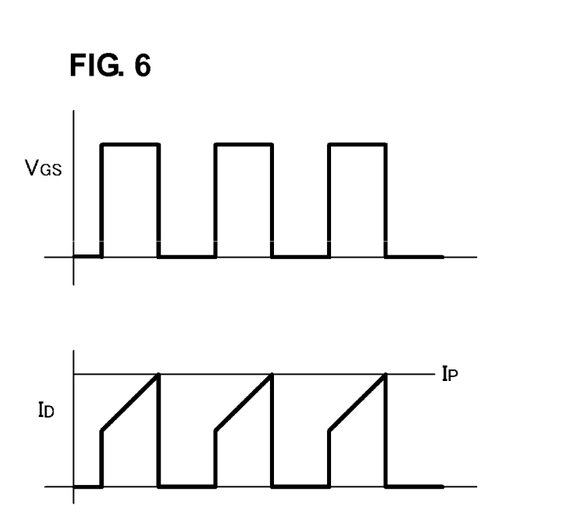
FIG. 6 includes a waveform diagram of current flowing into a switching element of the switching power supply apparatus and a waveform diagram of a gate control signal of the switching element.

FIG. 6 includes a waveform diagram of current $I_D$ flowing into the switching element Q1 of the switching power supply apparatus 102 shown in FIG. 5 and a waveform diagram of a gate control signal $V_{GS}$ of the switching element Q1. While the level of the gate control signal $V_{GS}$ is high, the switching element Q1 is on. The secondary-side digital control circuit 16 of the switching power supply apparatus 102 transmits information about the peak current $I_P$ to the digital control circuit 15, that is, the digital control circuit 16 transmits a digital value that the digital control circuit 15 uses in order to set $I_P$ as the peak current of the switching element Q1.

The secondary-side digital control circuit 16 includes an AD converter 161, an adder 162, an operation unit 163, and a communication circuit 164. On the basis of an error e, the operation unit 163 obtains the peak current $I_P$ required to reduce the error e, unlike in the secondary-side digital control circuit 16 shown in FIG. 2, and performs predetermined phase compensation on the peak current. The amount of phase compensation is determined such that feedback operation is kept stable and highly responsive.

The primary-side digital control circuit 15 includes a communication circuit 151, a converter 155, a comparator 156, a clock generator 157, and a flip-flop 158.

The communication circuit 151 receives the data $I_P$. The converter 155 converts the data $I_P$ into an analog voltage signal. The comparator 156 compares the value of drain current $I_D$ detected by the current detection resistor R1 with the value of a voltage corresponding to the peak current data $I_P$. When the detected value of the drain current $I_D$ exceeds the voltage value corresponding to the peak current data $I_P$, the flip-flop 158 is reset. The flip-flop 158 is set in accordance with a clock signal from the clock generator 157.

Thus, when the peak current of the drain current $I_D$ of the switching element Q1 reaches the $I_P$, the switching element Q1 is turned off so that the on-time of the Q1 is controlled.

Third Preferred Embodiment

Figure 7:
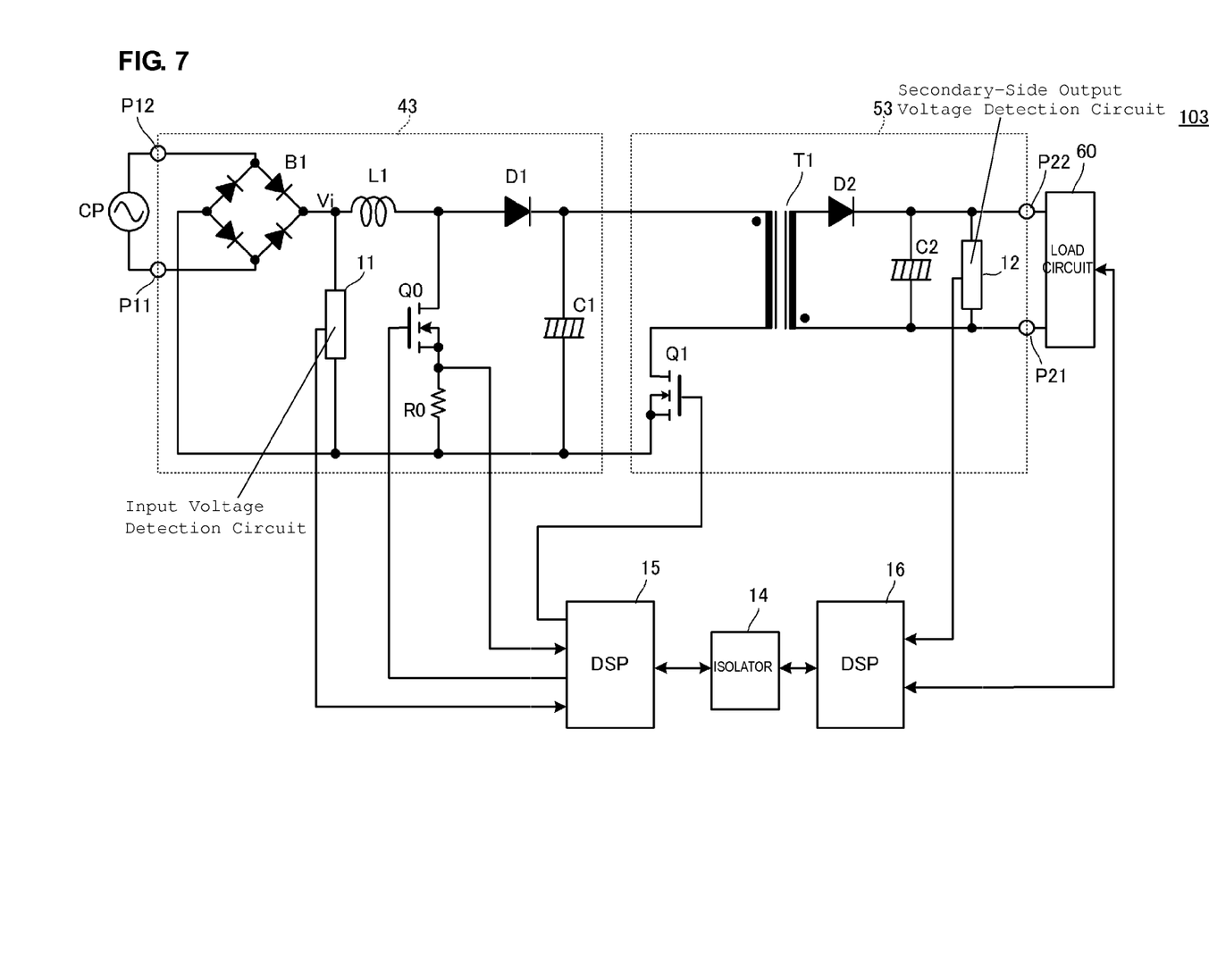
FIG. 7 is a circuit diagram of a switching power supply apparatus according to a third preferred embodiment of the present invention.

FIG. 7 is a circuit diagram of a switching power supply apparatus 103 according to a third preferred embodiment of the present invention. The switching power supply apparatus 103 includes a PFC converter 43, a DC-DC converter 53, and a primary-side digital control circuit 15, and a secondary-side digital control circuit 16. The primary-side and secondary-side digital control circuits control the PFC converter 43 and the DC-DC converter 53.

A commercial power supply CP is connected to voltage input units P11 and P12 of the switching power supply apparatus 103. A load 60 is connected to voltage output units P21 and P22 of the switching power supply apparatus 103.

A resistor R0 for inductor current detection is connected to the switching element Q0. A diode bridge B1, an inductor L1, a switching element Q0, a diode D1, and a capacitor C1 form the PFC converter 43.

A switching element Q1 defining a switching circuit is connected in series with the primary winding of a transformer T1. A secondary-side rectifying smoothing circuit including a diode D2, an inductor L2, and a capacitor C2 is provided between the secondary winding of the transformer T1 and the voltage output units P21 and P22.

The switching element Q1, the transformer T1, the diode D2, and the capacitor C2 define the flyback DC-DC converter 53.

The secondary-side digital control circuit 16 receives a voltage detected by a secondary-side output voltage detection circuit 12. The digital control circuit 16 transmits information about the on-time of the switching element Q1 to the primary-side digital control circuit 15 so that the voltage detected by the secondary-side output voltage detection circuit is maintained at a default value. On the basis of this information, the digital control circuit 15 determines the on-time of the switching element Q1.

The secondary-side digital control circuit 16 includes a transmitter that transmits, to the load 60, at least one of an input voltage (average value) from the primary-side digital control circuit 15, an output voltage of the PFC converter, current flowing into the inductor L1, and current flowing into the switching element Q0. The load 60 performs a predetermined process on the basis of these pieces of information.

The primary-side digital control circuit 15 receives a signal from an input voltage detection circuit 11, which is disposed subsequent to the diode bridge B1 and detects an input voltage (instantaneous voltage). The digital control circuit 15 also receives a detected signal of the drain current of the switching element Q0 that is on. When the primary-side digital control circuit 15 is placed in continuous current mode, where there is no current-zero period, it obtains the intermediate value between the maximum value and the minimum value of the current as the average current. If a current-zero period occurs, the primary-side digital control circuit 15 obtains the average value of the inductor current by making approximate correction.

The primary-side digital control circuit 15 then controls the on-time of the switching element Q0 so that the waveform of the average value of the inductor current is similar to the shape of an output voltage of the diode bridge B1.

The primary-side digital control circuit 15 also controls the switching element Q1 of the DC-DC converter 53 on the basis of the data from the secondary-side digital control circuit 16.

The primary-side digital control circuit 15 receives a signal from the input voltage detection circuit 11 to obtain the average value of the input voltage and transmits the information obtained to the secondary-side digital control circuit 16. If necessary, the primary-side digital control circuit 15 detects an output voltage of the PFC converter 43 and transmits the information detected to the secondary-side digital control circuit 16. If necessary, the primary-side digital control circuit 15 directly detects current flowing into the inductor L1 or detects such current by performing an operation, and transmits the information detected to the secondary-side digital control circuit 16.

As seen, the primary-side digital control circuit 15 performs both the switching control of the PFC converter 43 and the switching control of the DC-DC converter 53. This eliminates the need to separately provide a circuit to perform switching control of the isolated DC-DC converter 53, allowing simplification of the entire circuit configuration. Further, since the primary-side digital control circuit 15 keeps track of both the PFC converter 43 and the isolated DC-DC converter 53, it can easily associate the operations of the PFC converter 43 and the isolated DC-DC converter 53 with each other. This allows formation of a highly functional switching power supply apparatus.

Fourth Preferred Embodiment

Figure 8:
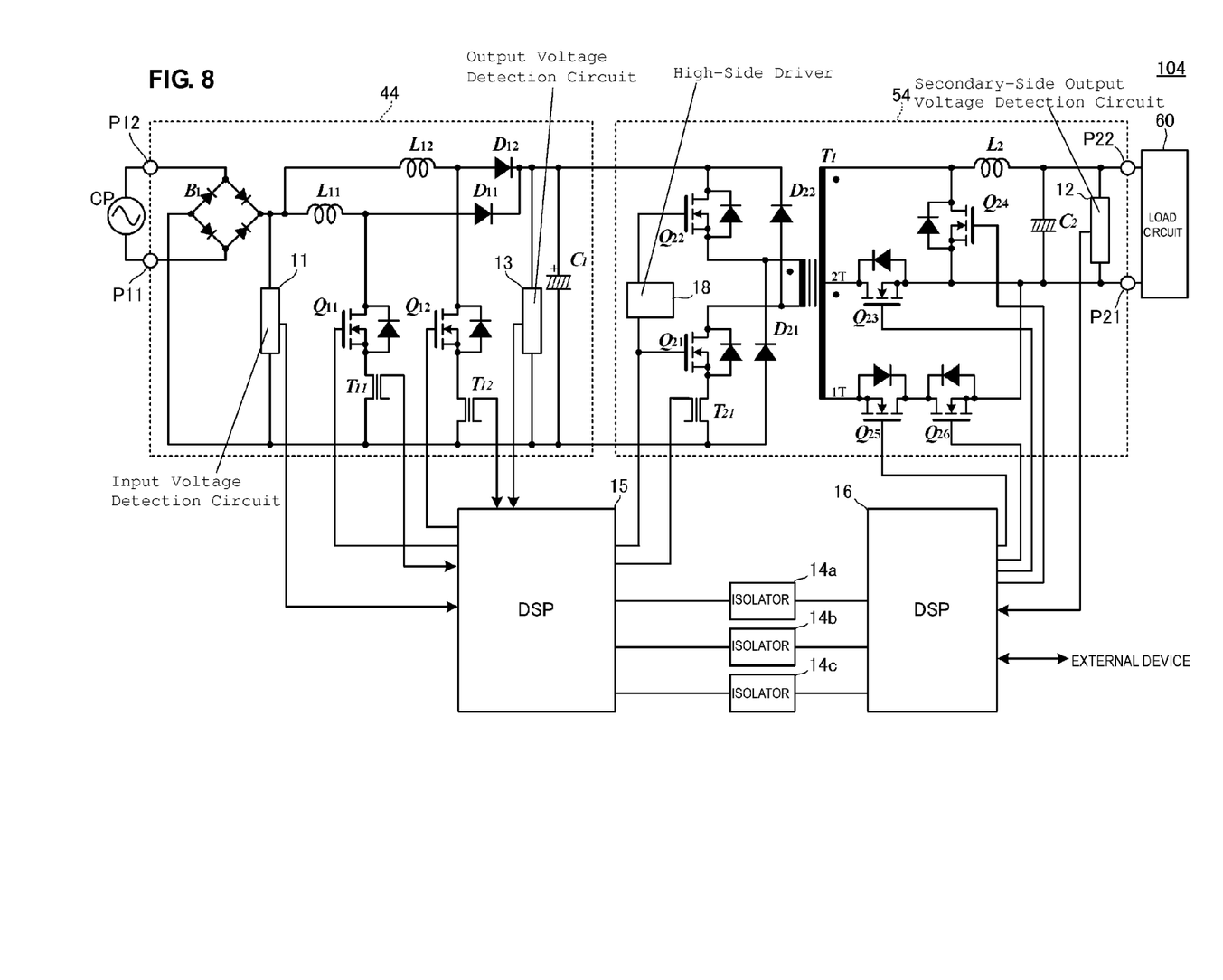
FIG. 8 is a circuit diagram of a switching power supply apparatus according to a fourth preferred embodiment of the present invention.

FIG. 8 is a circuit diagram of a switching power supply apparatus 104 according to a fourth preferred embodiment of the present invention. The switching power supply apparatus 104 includes a PFC converter 44, a DC-DC converter 54, and a primary-side digital control circuit 15, and a secondary-side digital control circuit 16. The primary-side and secondary-side digital control circuits control the PFC converter 44 and the DC-DC converter 54.

A commercial power supply CP is connected to voltage input units P11 and P12 of the switching power supply apparatus 104. A load 60 is connected to voltage output units P21 and P22 of the switching power supply apparatus 104.

Current transformers T11 and T12 are connected to switching elements Q11 and Q12, respectively. A diode bridge B1, inductors L11 and L12, the switching elements Q11 and Q12, diodes D11 and D12, and a capacitor C1 define the two-phase interleaved converter 44.

Switching elements Q21 and Q22 defining switching circuits, and diodes D21 and D22 are connected to the primary winding of a transformer T1. A secondary-side rectifying smoothing circuit including synchronous rectifying elements Q23, Q24, Q25, and Q26, an inductor L2, and a capacitor C2 is provided between the secondary winding of the transformer T1 and the voltage output units P21 and P22.

The switching elements Q21 and Q22, the transformer T1, the synchronous rectifying elements Q23, Q24, Q25, and Q26, the inductor L2, and the capacitor C2 define the forward DC-DC converter 54.

The secondary-side digital control circuit 16 receives a voltage detected by a secondary-side output voltage detection circuit 12. The digital control circuit 16 communicates with the primary-side digital control circuit 15 in an isolated state, as well as communicating with an external device, such as another switching power supply apparatus.

The secondary-side digital control circuit 16 detects a synchronous rectification timing on the basis of data from the primary-side digital control circuit 15 so as to control the secondary-side synchronous rectifying elements Q23, Q24, Q25, and Q26 of the DC-DC converter 54.

The digital control circuit 16 transmits, to the primary-side digital control circuit 15, data to control the PFC converter 44 and the DC-DC converter 54 so that the voltage detected by the secondary-side output voltage detection circuit is maintained at a default value and so that the condition determined by the relationship between the digital control circuit 16 and the external device is met.

The primary-side digital control circuit 15 receives a signal from an input voltage detection circuit 11 and a signal from an output voltage detection circuit 13 of the PFC converter 44.

The digital control circuit 15 also receives detected signals from the current transformers T11 and T12. On the basis of these received signals, the digital control circuit 15 controls the switching elements Q11 and Q12 so as to cause the PFC converter 44 to operate as a two-phase PFC converter.

The digital control circuit 15 also receives a signal from a current transformer T21, which detects current flowing into the switching element Q21 of the DC-DC converter 54. The digital control circuit 15 controls the switching elements Q21 and Q22 of the DC-DC converter 54 so as to control the primary side of the DC-DC converter 54. A high-side driver 18 generates a gate voltage for the high-side switching element Q22.

The primary-side digital control circuit 15 provides the on/off timings of the switching elements Q21 and Q22 to the secondary-side digital control circuit 16. When the primary-side digital control circuit 15 detects, on the basis of a signal from the input voltage detection circuit 11, that the commercial power supply CP has failed (instantaneous power failure), it transmits, to the secondary-side digital control circuit 16, information indicating that power has failed (power failure information).

The secondary-side digital control circuit 16 receives the power failure information and uses the synchronous rectifying elements Q25 and Q26 instead of the Q23. That is, the digital control circuit 16 switches the secondary taps of the transformer T1. This suppresses a reduction in voltage to be provided to the load. Note that the synchronous rectifying element Q25, which is reversed relative to the synchronous rectifying element Q26, is connected in series with the Q26. This prevents feedback current from passing through the body diode of the synchronous rectifying element Q26 when the synchronous rectifying element Q23 is on.

The digital control circuits 15 and 16 communicate with each other via isolated signal transmitter 14a, 14b, and 14c. For example, the isolated signal transmitter 14a is intended to transmit clock signals; the isolated signal transmitter 14b to transmit signals from the primary side to the secondary side; and the isolated signal transmitter 14c to transmit signals from the secondary side to the primary side.

As seen, the primary-side digital control circuit 15 may perform the control of the PFC converter 44 and the primary-side switching control of the DC-DC converter 54, while the secondary-side DC-DC converter 54 may perform synchronous rectification control.

Fifth Preferred Embodiment

Figure 9:
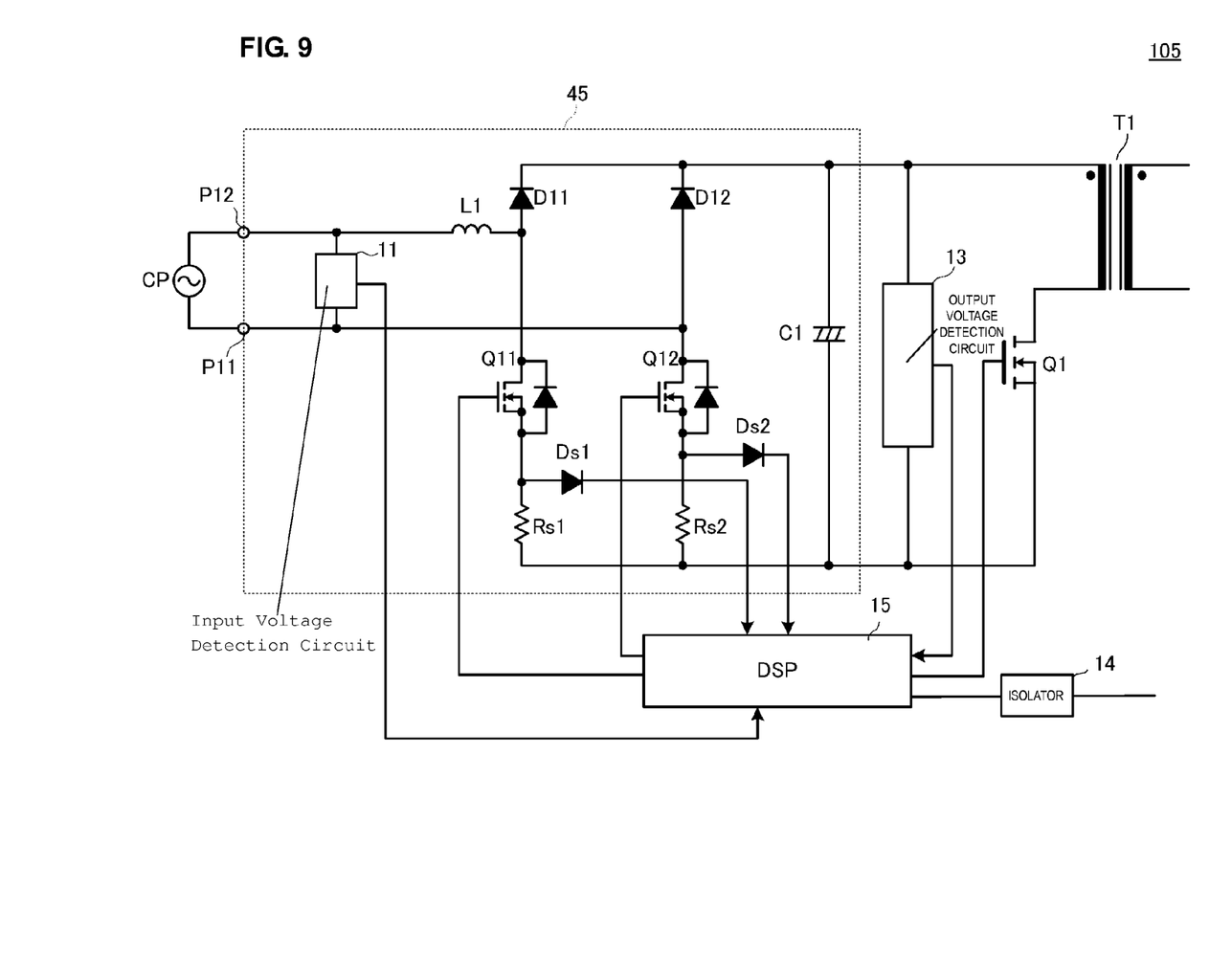
FIG. 9 is a circuit diagram of a portion of a switching power supply apparatus according to a fifth preferred embodiment of the present invention.

FIG. 9 is a circuit diagram of a portion of a switching power supply apparatus 105 according to a fifth preferred embodiment of the present invention. The switching power supply apparatus 105 includes a PFC converter 45 and a primary-side digital control circuit 15, which controls the PFC converter 45. The configurations of a DC-DC converter and a secondary-side digital control circuit to control the DC-DC converter are as shown in some of the above-mentioned preferred embodiments.

No diode bridge for full-wave rectifying the voltage of a commercial power supply is provided at the input stage of the PFC converter 45.

A bridge circuit includes two switching elements, Q11 and Q12, and two diodes, D11 and D12, defines a rectifying switching circuit. An inductor L1 is interposed between the connection between the switching element Q11 and the diode D11, and a first input terminal P12 connected to the commercial power supply. A capacitor C1 defining a smoothing circuit is provided subsequent to the rectifying switching circuit.

Current detection resistors Rs1 and Rs2 are connected in series with the switching elements Q11 and Q12, respectively. Voltages detected by the current detection resistors Rs1 and Rs2 are inputted into the primary-side digital control circuit 15 via diodes Ds1 and Ds2.

The rectifying switching circuit and the smoothing circuit define the PFC converter 45. The primary-side digital control circuit 15 controls the switching elements Q11 and Q12 so as to cause the PFC converter 45 to operate as a PFC converter.

As seen, a bridgeless PFC converter, which includes no diode bridge, may be provided.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An isolated switching power supply apparatus comprising:
    a power factor correction converter including:
        a voltage input unit arranged to receive a voltage of a commercial power supply;
        a rectifier circuit arranged to rectify the commercial power supply voltage received by the voltage input unit;
        at least one boost converter circuit that is connected to a latter stage of the rectifier circuit and includes an inductor, a switching element, and a rectifying element;
        a smoothing circuit connected to a latter stage of the boost converter circuit; and
        a switching controller arranged to on/off control the switching element so that input current received from the commercial power supply has a shape similar to a shape of the commercial power supply voltage;
    a transformer including at least isolated primary and secondary windings;
    a switching circuit arranged to switch a voltage to be applied to the primary winding by the smoothing circuit;
    a secondary-side rectifying smoothing circuit arranged to rectify and smooth an alternating-current voltage generated in the secondary winding;
        a voltage output unit arranged to output a voltage obtained by the secondary-side rectifying smoothing circuit;
        a secondary-side output voltage detector arranged to detect a voltage obtained by the secondary-side rectifying smoothing circuit;
    a primary-side digital control circuit that is disposed on the primary side of the transformer and includes a switching controller arranged to control on/off operation of at least one of the boost converter circuit and the switching circuit;
    a secondary-side digital control circuit that is disposed on the secondary side of the transformer, is arranged to receive the voltage detected by the secondary-side output voltage detector, and includes a feedback controller arranged to generate a feedback signal to control the switching circuit; and
    an isolated signal transmitter arranged to perform serial communications between the primary-side and secondary-side digital control circuits while maintaining isolation therebetween.

2. The isolated switching power supply apparatus according to claim 1, wherein the boost converter circuit includes n number of boost converter circuits, where n is an integer equal to two or more;
    the boost converter circuits are connected to the latter stage of the rectifier circuit in such a manner that the boost converter circuits are in parallel with one another; and
    the respective switching elements of the boost converter circuits are switched with a phase difference of 360°/n.

3. The isolated switching power supply apparatus according to claim 1, further comprising:
    a switching circuit current detection circuit arranged to detect switching circuit current flowing into the switching circuit; wherein
    the switching controller is arranged to control the switching circuit on the basis of the current detected by the switching circuit current detection circuit and a control signal from the secondary-side digital control circuit.

4. The isolated switching power supply apparatus according to claim 1, wherein the secondary-side digital control circuit is arranged to communicate with a load circuit connected to the voltage output unit and to perform an operation process required to control the switching circuit.

5. The isolated switching power supply apparatus according to claim 4, wherein the secondary-side digital control circuit is arranged to transmit, to the load circuit, at least one of the input voltage, an output voltage of the power factor correction converter, current flowing into the inductor, and the switching circuit current.

6. The isolated switching power supply apparatus according to claim 1, wherein the secondary-side rectifying smoothing circuit is a synchronous rectifier circuit including a synchronous rectifying element; and
    the secondary-side digital control circuit including a switching controller arranged to control on/off operation of the synchronous rectifying element.

7. The isolated switching power supply apparatus according to claim 1, wherein the isolated signal transmitter includes a digital isolator arranged to convert a rising edge and a falling edge of a binary signal into different pulse signals, to transmit the pulse signals by magnetic coupling, and to reconvert the pulse signals into a binary signal.

8. The isolated switching power supply apparatus according to claim 1, wherein each of the primary-side and secondary-side digital control circuits includes a digital signal processor.

9. An isolated switching power supply apparatus comprising:
    a bridgeless power factor correction converter including:
        a voltage input unit arranged to receive a voltage of a commercial power supply;
        a first rectifier circuit including a series circuit of a first switching element and a rectifying element and is connected to a first terminal of the voltage input unit via an inductor;
        a second rectifier circuit including a series circuit of a second switching element and a rectifying element and is connected to a second terminal of the voltage input unit;
        a smoothing circuit connected to a latter stage of the second rectifier circuit; and
        a switching controller arranged to on/off control the first and second switching elements so that input current received from the commercial power supply has a shape similar to a shape of the commercial power supply voltage;

a transformer including at least isolated primary and secondary windings;

a switching circuit arranged to switch a voltage to be applied to the primary winding by the smoothing circuit;

a secondary-side rectifying smoothing circuit arranged to rectify and smooth an alternating-current voltage generated in the secondary winding;

a voltage output unit arranged to output a voltage obtained by the secondary-side rectifying smoothing circuit;

a secondary-side output voltage detector arranged to detect the voltage obtained by the secondary-side rectifying smoothing circuit;

a primary-side digital control circuit that is disposed on the primary side of the transformer and includes a switching controller arranged to control on/off operation of at least one of the first and second rectifier circuits and the switching circuit;

a secondary-side digital control circuit that is disposed on the secondary side of the transformer, is arranged to receive the voltage detected by the secondary-side output voltage detector, and includes a feedback controller arranged to generate a feedback signal to control the switching circuit; and an isolated signal transmitter arranged to perform serial communications between the primary-side and secondary-side digital control circuits while maintaining isolation therebetween; wherein terminals adjacent to the first and second switching elements of the first and second rectifier circuits are connected to each other; and terminals adjacent to the rectifier elements of the first and second rectifier circuits are connected to each other.

* * * * *